United States Patent

Schumacher et al.

[11] Patent Number: 6,075,368
[45] Date of Patent: Jun. 13, 2000

[54] METHOD OF IMPROVING FAULT CURRENT MEASUREMENT ACCURACY ON ELECTRONIC RECLOSURE CONTROL

[75] Inventors: Philip P. Schumacher, Greenfield; James C. Cummins, Greendale, both of Wis.

[73] Assignee: Cooper Industries, Inc., Houston, Tex.

[21] Appl. No.: 08/912,175

[22] Filed: Aug. 15, 1997

Related U.S. Application Data

[62] Division of application No. 08/401,730, Mar. 10, 1995, Pat. No. 5,701,080.

[51] Int. Cl.[7] ............ G01R 27/26; G01R 31/08; H02H 3/00
[52] U.S. Cl. ............ 324/539; 361/93.4; 702/58
[58] Field of Search ............ 324/115, 522, 324/526, 539; 702/60, 61, 62, 58, 59; 364/528.28; 361/59, 60, 71, 90, 91, 93.4, 115, 91.1

[56] References Cited

U.S. PATENT DOCUMENTS

| | | | |
|---|---|---|---|
| 3,204,144 | 8/1965 | Deavenport | 324/115 |
| 3,873,918 | 3/1975 | Talbert | 324/115 |
| 4,507,700 | 3/1985 | Andow et al. | 364/528.28 |
| 4,535,409 | 8/1985 | Jindrick et al. | 364/528.28 |
| 4,745,512 | 5/1988 | Hampson | 364/528.28 |
| 4,845,594 | 7/1989 | Wilkerson | 361/71 |
| 4,904,945 | 2/1990 | Kouan et al. | 324/547 |
| 4,951,170 | 8/1990 | Fromm | 364/528.28 |
| 4,994,934 | 2/1991 | Bouhenguel | 361/71 |
| 4,996,646 | 2/1991 | Farrington | 364/528.28 |
| 5,117,325 | 5/1992 | Dunk et al. | 361/71 |
| 5,224,011 | 6/1993 | Yalla et al. | 361/93.4 |
| 5,303,112 | 4/1994 | Zulaski et al. | 361/71 |
| 5,347,464 | 9/1994 | McEachern et al. | 324/520 |
| 5,512,832 | 4/1996 | Russell et al. | 324/522 |
| 5,534,782 | 7/1996 | Nourse | 324/522 |

*Primary Examiner*—Ernest Karlsen
*Attorney, Agent, or Firm*—Fish & Richardson, PC

[57] ABSTRACT

A method of improving fault current measurement accuracy on a power line is disclosed. A first sample is obtained from a first input channel. A current magnitude is calculated from the first sample. The current magnitude is compared to a possible current saturation value. If the current magnitude is less than the possible current saturation value, a second sample from a second input channel is obtained, and the current magnitude is recalculated from the second sample. Lastly, the current magnitude is scaled by a scale factor. Also disclosed is an apparatus for improving fault current measurement accuracy on electronic reclosure control.

13 Claims, 10 Drawing Sheets

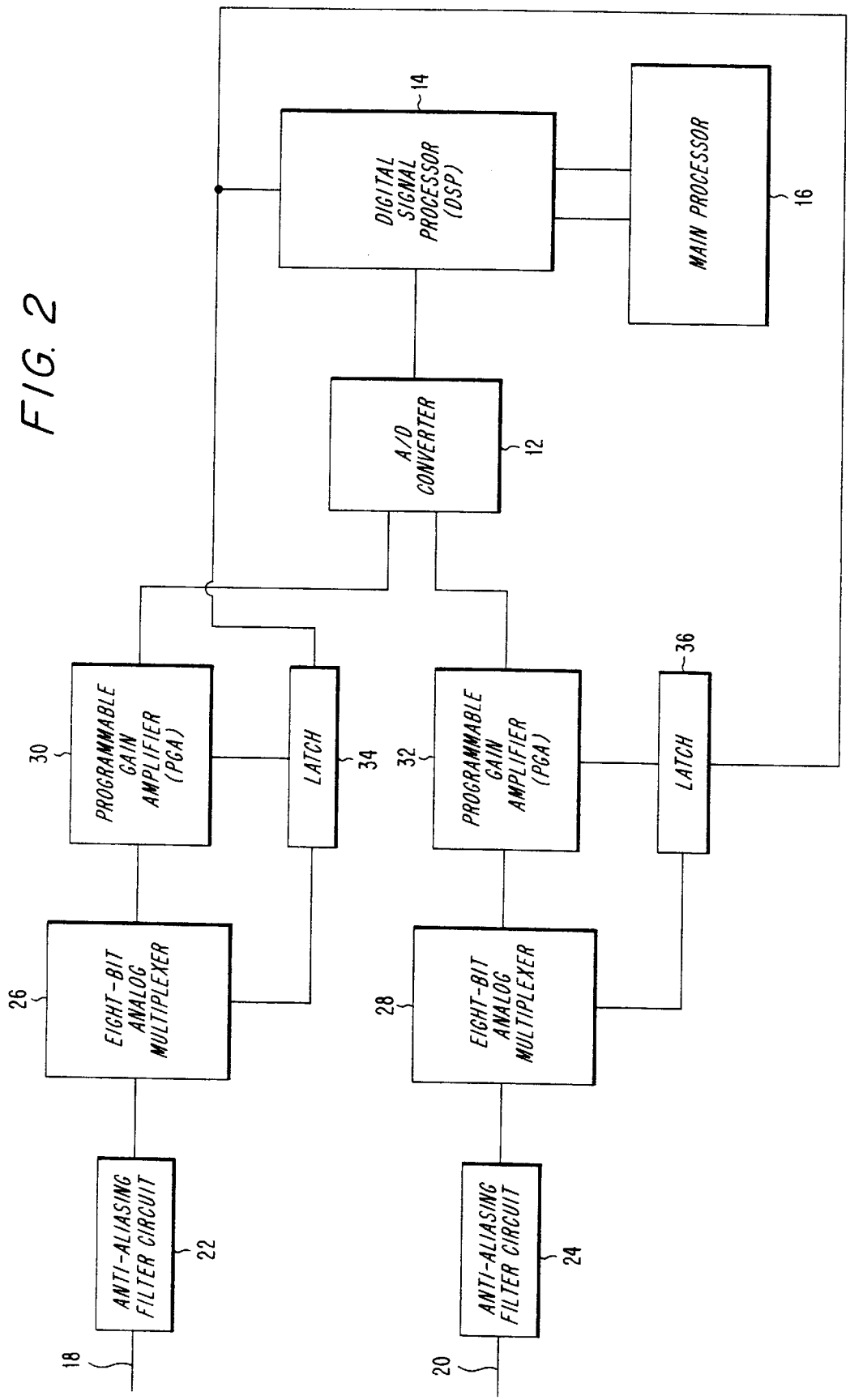

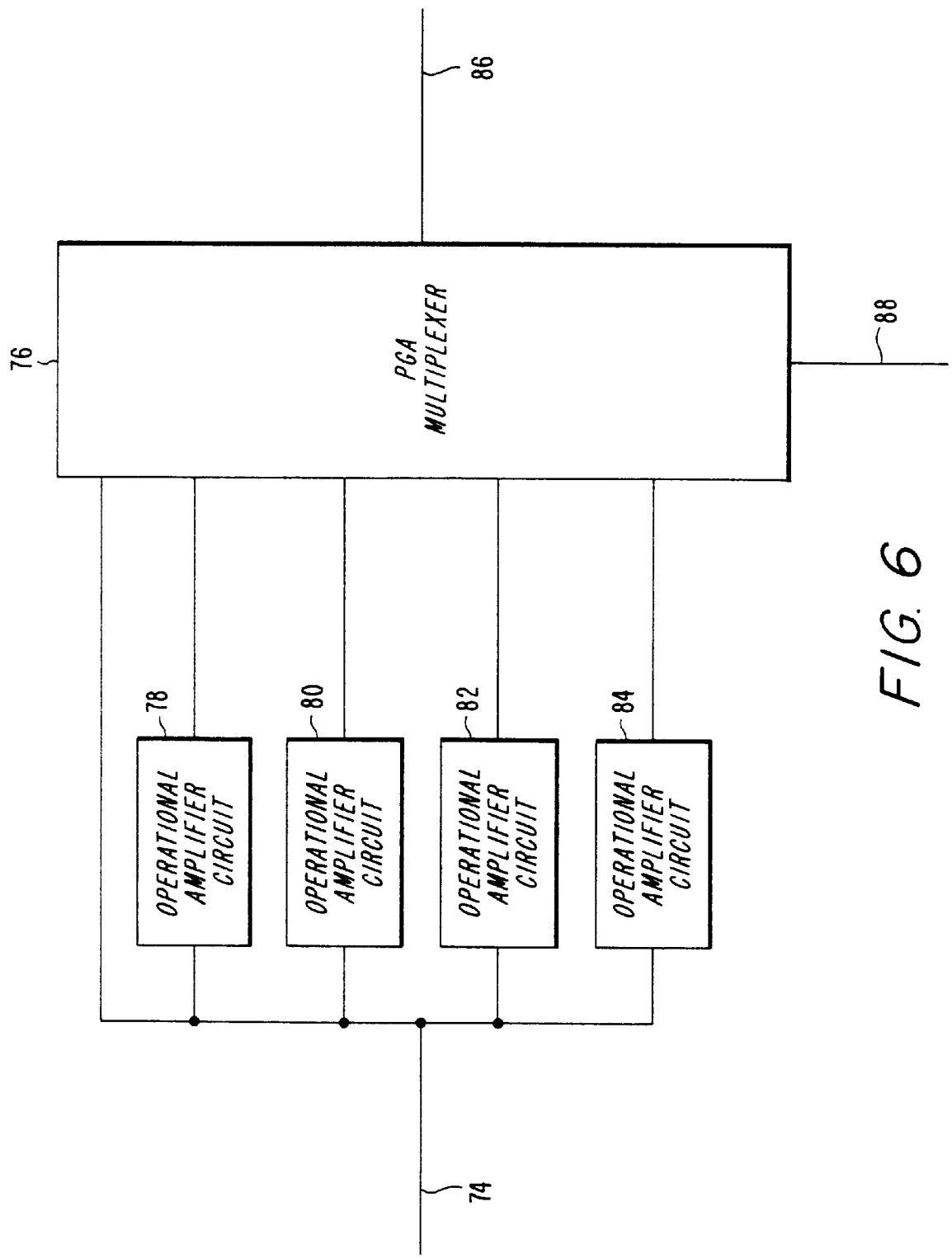

Fault Magnitude Calculation

METHOD OF IMPROVING FAULT CURRENT MEASUREMENT ACCURACY ON ELECTRONIC RECLOSURE CONTROL

This application is a divisional, of application Ser. No. 08/401,730, filed Mar. 10, 1995, now U.S. Pat. No. 5,701,080.

FIELD OF THE INVENTION

The present invention relates to a method of precisely measuring fault current levels on a power distribution system. Since the invention is primarily useful in combination with an electronic reclosure control system, the relevant fields of the invention are the field of power distribution and control, and the corresponding field of overcurrent coordination and protection.

BACKGROUND OF THE INVENTION

Since the present invention is most beneficial when used in conjunction with an electronic reclosure control system, specific background information regarding reclosers and electronic reclosure control systems is set forth hereinafter. A recloser is defined by the *IEEE Guide for Protective Relaying of Utility-Consumer Interconnections*, ANSI/IEEE Std. C37.95-1989, as a device which automatically closes a circuit-interrupting device following an automatic tripping. The reclosing is initiated by an electronic reclosure control system, and may be programmed for any combination of instantaneous, time-delay, single shot, multiple-shot, synchronism-check, dead-line-live-bus, or dead-bus-live-line operation.

Reclosers are inserted into power lines to protect a power distribution system. Most faults on power distribution lines are of the momentary nature and of sufficient magnitude to blow fuses if the fault is allowed to be conducted to the fuse. When a fuse does blow in a power distribution system, it is necessary to dispatch an electrician to replace the blown fuse, which can be an expensive proposition. Furthermore, a blown fuse will result in a substantial period of downtime for a process, thereby resulting in a substantial loss of profit.

A primary function of a recloser is to prevent momentary faults from being conducted to fuses. In general, this goal is achieved by having the reclosure control system sense the value of the current conducted in the power line and interrupt its flow by opening or tripping a recloser before the fuses can blow. After an interval, the reclosure control system allows the recloser to close, thereby restoring power to the system. The recloser remains closed until the next fault is sensed. The rate at which a fuse will blow, and thus interrupt current, is generally a function of the thermal heating of the fusible element. The rate of thermal heating is proportional to the current consumed by the fault. Each fuse generally has a logarithmic time vs. current characteristic curve which describes the time interval required to interrupt the fault current. The time interval in these fuses is approximately inversely proportional to the value of the root mean square of the fault current.

It is desirable to selectively coordinate the recloser with the fuses in order to insure that the reclosure control system in fact interrupts temporary fault currents before the fuses to be protected are blown. This is generally performed by approximating the root mean square value of the fault current by sensing its peak value. It must also be recognized that all faults which occur on a power distribution line are not temporary, such as those caused by a branch momentarily falling against a transmission line. Some faults are of a more permanent nature such as those caused by a transmission line falling to the ground. As a consequence, reclosers are built so that they will only trip a limited number of times within a short duration before locking open. If this not done, the reclosure control system generally would have the recloser cycle until failure and many of the fuses to be protected would be destroyed.

At some magnitude of fault current, the reclosure control system needs to immediately open the recloser to protect the line rather than following the time vs. current characteristic curve. At intermediate levels it may be desirable from the power distribution stand-point to allow the fault current to flow for a limited period to allow the fault to burn itself open or blow the fuse. Many reclosure control systems utilize alternate time vs. current characteristic curves which achieve this goal. Typically, a reclosure control system will allow two shots or trip operations to follow a fast time current characteristic and two additional shots along a somewhat slower time current characteristic before locking open or out.

However, there are a number limitations in the currently available electronic reclosure control systems on the market. One limitation pertains to the method the reclosure control systems utilize to calculate current magnitudes. The presently commercially available reclosure control systems typically use a single scale range for each single current magnitude calculation. By utilizing only a single source, either the accuracy of the pickup current is substantially decreased, or the accuracy for large currents is decreased. Pickup current is defined by the *IEEE Standard Definitions for Power Switchgear*, ANSI/IEEE Std. C37.100-1992, as the minimum input that will cause a device to complete contact operation. Therefore, by utilizing an inaccurate pickup current value, the reclosure control systems have an increased probability of incorrectly tripping on a current slightly below the pickup value. Furthermore, the available control systems have an increased probability of incorrectly failing to trip on a current slightly above the pickup value.

Another limitation pertains to the method in which the commercially available reclosure control systems compute the necessary fourier transforms. In order for reclosure control systems to calculate the magnitude of current which is present on the power line, a fourier transform is used. Present control systems generally utilize a recursive method of computing the fourier transform. The recursive method of computing the fourier transforms in these systems is inherently prone to cumulative errors. The cumulative errors found in the recursive method are directly caused by the control systems' arithmetical truncation errors.

Another limitation in the commercially available reclosure systems is the use of the fourier transforms just to filter out the harmonics. However, the harmonic values on the power line are never calculated for reporting or alarm purposes.

Still a further limitation in the available reclosure systems pertains to the filtering out of the direct current (DC) component. With most reclosure control systems available on the market, the DC component is filtered out along with the harmonics, prior to the calculation of the fault magnitude. Thus, the magnitude of a fault which contains a decaying DC component is inaccurately represented.

Still another limitation in the available reclosure systems pertains to the rate at which samples of data are taken. Instead of obtaining data samples and performing the fourier transforms on the sampled data at a frequency dependent on the timeliness requirement of the data, the currently available reclosure control systems have a maximum sampling rate of 16 times/cycle.

A further limitation pertains to the number of unnecessary hardware components the available reclosure control systems utilize. The available reclosure control systems require a dual ported random access memory ("RAM") between the digital signal processor ("DSP") and the main processor. These control systems employ the RAM in order to effectuate communication between the DSP and the main processor. In addition, these systems require a high speed, external, read only memory (ROM) chip. Other systems run the DSP program from an external ROM. Thus, either a very expensive high speed ROM is required, or wait-states must be implemented in the DSP execution in order to slow the processing. Alternatively, some control systems download the DSP program from an external ROM into the DSP RAM, thereby enabling the program to execute at full speed. In either case, an extra component which is quite expensive must be utilized.

Thus, one of the objects of the present invention is to provide a method to accurately measure the magnitude of a fault, so that the reclosure control system will not trip on a current level slightly below the pickup value, but will properly trip on a current level slightly above the pickup value.

Another object of the present invention is to utilize a method of computing the fourier transforms which will not be prone to cumulative errors cause by arithmetical truncation errors.

Another object of the present invention is to be able to calculate the harmonic values on power line up to the fifteenth harmonic for reporting and alarm purposes.

Another object of the present invention is to include the DC component in the calculation of the current magnitude in order to accurately represent a fault with a decaying DC component.

Another object of the present invention is to be able to obtain data samples and perform fourier transforms on the sampled data at a frequency dependent on the timeliness requirement of the data.

Another object of the present invention is to be able perform all digital signal processing, storage of data, computations, and communications pertaining to the calculation of current and voltage utilizing a DSP processor, without the use of an external RAM or ROM.

A still further object of the present invention is to be able to perform all digital signal processing, storage of data, computations, and communications without substantially utilizing a wait state.

SUMMARY OF INVENTION

The present invention allows an electronic reclosure control system to more accurately measure power line current levels in order to correctly determine the magnitude of a fault. In order to achieve this increased accuracy, the invention employs dual scaled fault current measurement channels and a discrete fourier transform calculation. The dual scaling yields a greatly improved fault current measurement accuracy for current levels low enough to be accommodated on the sensitive scale. These lower currents occur when the fault current is near the control system's pickup current.

In addition, the discrete fourier transform calculation employed in the invention to calculate the various current components, yields a current magnitude that is responsive to the power line fundamental frequency and any DC current offset. Thus, the prototypes of this invention have proved to be insensitive to any current harmonics up to the thirtieth harmonic.

The method of the present invention improves the accuracy of measurement of fault current on a single phase or multiple phase power line. A first sample is obtained from a first input channel. A current magnitude is calculated from the first sample. The current magnitude is compared to a possible current saturation value. If the current magnitude is less than the possible current saturation value, a second sample from a second input channel is obtained, and the current magnitude is recalculated from the second sample. The current magnitude is scaled by a scale factor.

The method of the present invention improves the accuracy of measurement of fault current on a single phase or a multiple phase power line. A first sample is obtained from a first input channel. A real current component, an imaginary current component, and a DC current component are calculated from the first sample. A current magnitude is calculated from the real current component, the imaginary current component, and the DC current component. The current magnitude is compared to a possible current saturation value. If the current magnitude is less than the possible current saturation value, the following additional steps are performed: a second sample is obtained from a second input channel; the real current component, the imaginary current component, and the DC current component are recalculated; and, the current magnitude is recalculated from the real current component, the imaginary current component, and the DC current component. The current magnitude is scaled by a scale factor.

The electrical circuit of the present invention improves fault current measurement accuracy for use with electronic reclosure controls. The electrical circuit receives a first current sample from a first input mechanism. The electrical circuit also receives a second current sample from a second input mechanism. In addition, the electrical circuit includes a first analog multiplexer. The first analog multiplexer has a first input channel which is coupled to the first input mechanism and a second input channel which is coupled to the second input mechanism. Furthermore, the first analog multiplexer has a selector input and an output. The electrical circuit also includes a programmable gain amplifier mechanism. The programmable gain amplifier mechanism has an analog input, a selector input, and an output. The analog input of the programmable gain amplifier mechanism is operatively connected to the output of the first analog multiplexer. The electrical circuit also has an analog-to-digital converter with an analog input and a digital output. The analog input of the analog-to-digital converter is operatively coupled to the output of the programmable gain amplifier mechanism. In addition, the electrical circuit contains a digital signal processing mechanism with a first input, a second input, a first output, and a second output. The first input of the digital signal processing mechanism is operatively connected to the output of the analog-to-digital converter. The electrical circuit also contains a latching mechanism with an input, a first output, and a second output. The input of the latching mechanism is coupled to the first output of the digital signal processing mechanism. The first output of the latching mechanism is operatively coupled to the selector input of the first analog multiplexer. The second output of the latching mechanism is operatively coupled to the selector input of the programmable gain amplifier mechanism. Lastly, the electrical circuit includes a microprocessor mechanism with an input and an output. The input of the microprocessor mechanism is operatively connected to the second output of the digital signal processing mechanism. The output of the microprocessor mechanism is operatively connected to the second input of the digital signal processing mechanism.

The electrical circuit of the present invention improves fault current measurement accuracy for use with electronic reclosure controls. The circuit receives a first voltage input, a second voltage input, a third voltage input, a first current input, a second current input, a third current input, a fourth current input, a fifth current input, a sixth current input, a seventh current input, an eighth current input, and a nineth current input. The circuit contains a first multiplexer. The first multiplexer has a first multiplexer first input coupled to the second voltage input, a first multiplexer second input coupled to the third voltage input, a first multiplexer third input coupled to the fourth current input, a first multiplexer fourth input coupled to the first current input, a first multiplexer fifth input coupled to the fifth current input, a first multiplexer sixth input coupled to the eighth current input, a first multiplexer selector input, and a first multiplexer output. The circuit also contains a second multiplexer. The second multiplexer has a second multiplexer first input coupled to the first voltage input, a second multiplexer second input coupled to the second current input, a second multiplexer third input coupled to the sixth current input, a second multiplexer fourth input coupled to the third current input, a second multiplexer fifth input coupled to the seventh current input, a second multiplexer sixth input coupled to the nineth current input, a second multiplexer selector input, and a second multiplexer output. Another element contained in the circuit is a first programmable gain amplifier. The first programmable gain amplifier has a third multiplexer. The third multiplexer has a third multiplexer first input operatively coupled to the first multiplexer output, a third multiplexer second input, a third multiplexer third input, a third multiplexer fourth input, a third multiplexer fifth input, a third multiplexer selector input, and a third multiplexer output. The first programmable gain amplifier also has a first fixed gain operational amplifier circuit with a gain of two. The first fixed gain operational amplifier circuit is operatively interposed between the first multiplexer output and the third multiplexer second input. The first programmable gain amplifier also has a second fixed gain operational amplifier circuit with a gain of four. The second fixed gain operational amplifier circuit is operatively interposed between the first multiplexer output and the third multiplexer third input. The first programmable gain amplifier is also has a third fixed gain operational amplifier circuit with a gain of eight. The third fixed gain operational amplifier circuit is operatively interposed between the first multiplexer output and the third multiplexer fourth input. The first programmable gain amplifier also has a fourth fixed gain operational amplifier circuit with a gain of sixteen. The fourth fixed gain operational amplifier circuit is operatively interposed between the first multiplexer output and the third multiplexer fifth input. The circuit also contains a second programmable gain amplifier. The second programmable gain amplifier has a fourth multiplexer. The fourth multiplexer has a fourth multiplexer first input operatively coupled to the second multiplexer output, a fourth multiplexer second input, a fourth multiplexer third input, a fourth multiplexer fourth input, a fourth multiplexer fifth input, a fourth multiplexer selector input, and a fourth multiplexer output. The second programmable gain amplifier also has a fifth fixed gain operational amplifier circuit with a gain of two. The fifth fixed gain operational amplifier circuit is operatively interposed between the second multiplexer output and the fourth multiplexer second input. The second programmable gain amplifier also has a sixth fixed gain operational amplifier circuit with a gain of four. The sixth fixed gain operational amplifier circuit is operatively interposed between the second multiplexer output and the fourth multiplexer third input. The second programmable gain amplifier also has a seventh fixed gain operational amplifier circuit with a gain of eight. The seventh fixed gain operational amplifier circuit is operatively interposed between the second multiplexer output and the fourth multiplexer fourth input. The second programmable gain amplifier also has a eighth fixed gain operational amplifier circuit with a gain of sixteen. The eighth fixed gain operational amplifier circuit is operatively interposed between the second multiplexer output and the fourth multiplexer fifth input. The circuit also contains an analog-to-digital converter. The analog-to-digital converter has an analog-to-digital converter first analog input operatively coupled to the third multiplexer output, an analog-to-digital converter second analog input operatively coupled to the fourth multiplexer output, and an analog-to-digital converter digital output. In addition, the circuit contains a digital signal processing mechanism. The digital signal processing mechanism has a digital signal processing mechanism first input operatively connected to the analog-to-digital converter digital output, a digital signal processing mechanism second input, a digital signal processing mechanism first output, and a digital signal processing mechanism second output. The circuit also contains a first latching mechanism. The first latching mechanism has a first latching mechanism input coupled to the digital signal processing mechanism first output, a first latching mechanism first output operatively coupled to the first multiplexer selector input, and a first latching mechanism second output operatively coupled to the third multiplexer selector input. The circuit also contains a second latching mechanism. The second latching mechanism has a second latching mechanism input coupled to the digital signal processing mechanism first output, a second latching mechanism first output operatively coupled to the second multiplexer selector input, and a second latching mechanism second output operatively coupled to the fourth multiplexer selector input. The circuit also contains a microprocessing mechanism. The microprocessing mechanism has a microprocessing mechanism input operatively connected to the digital signal processing mechanism second output, and a microprocessing mechanism output operatively connected to the digital signal processing mechanism second input.

The foregoing features and advantages of the present invention will be apparent from the following more particular description of the invention. The accompanying drawings, listed hereinbelow, are useful in explaining the invention.

BRIEF DESCRIPTION OF DRAWINGS

In the text which follows, the invention is explained with reference to illustrative embodiments, in which:

FIG. 2 shows a single line diagram of the preferred embodiment of the electrical circuit in accordance with FIG. 1.

FIG. 6 shows a wiring diagram for the typical programmable gain amplifiers identified in FIG. 1 and FIG. 2.

DETAILED DESCRIPTION OF THE INVENTION

For a better understanding of the invention reference may be had to the following detailed description taken in conjunction with the accompanying drawings. Each reference number is consistent throughout all of the drawings.

Figure 1:
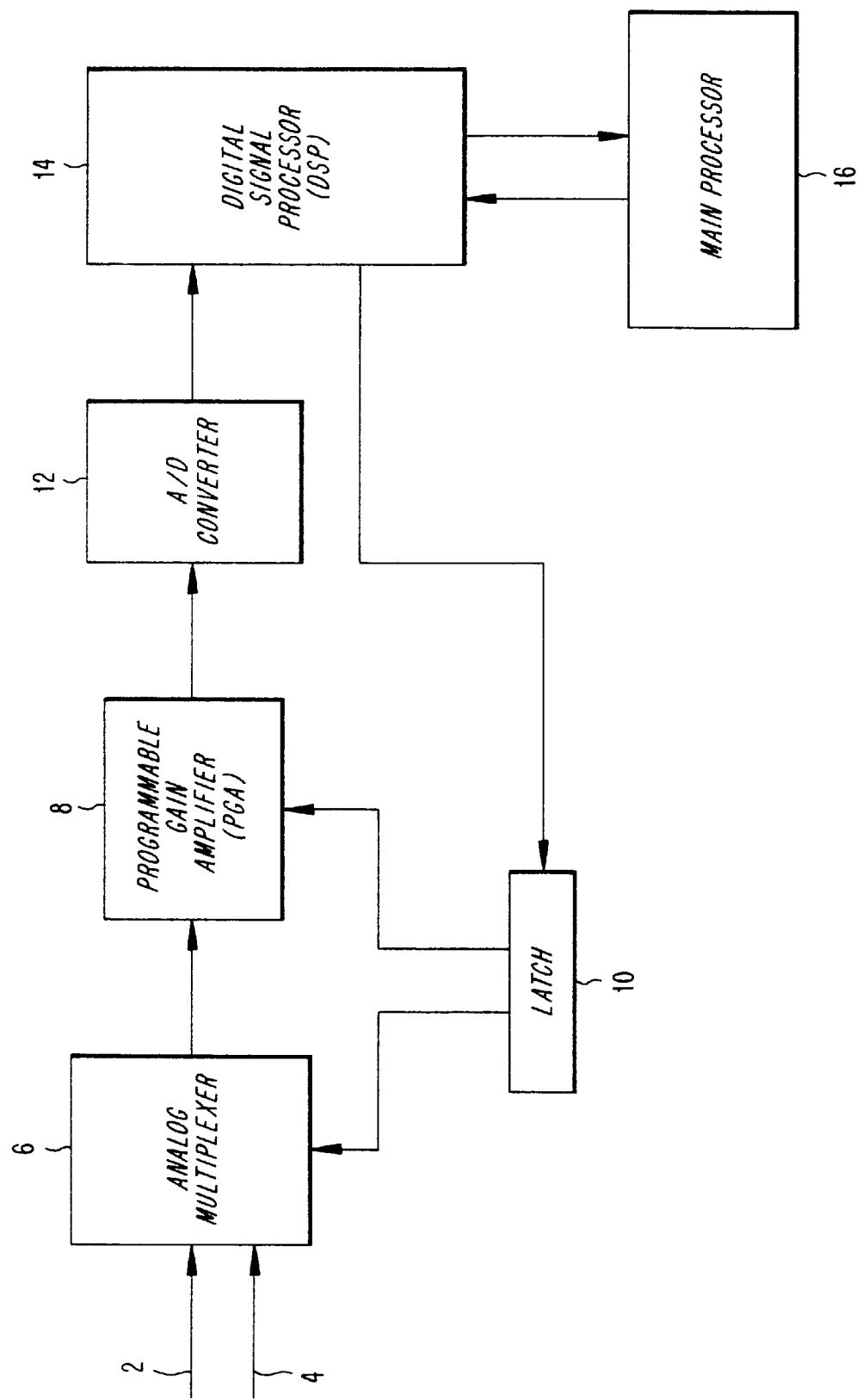
FIG. 1 shows a functional overview of the electrical circuit for improving accuracy on fault current measurement.

In FIG. 1, an analog multiplexer (6) receives an input from a first input channel (2) and an input from a second input channel (4). The first input channel (2) contains the following coarse current samples: phase A, phase B, and phase C. In addition, the first input channel (2) contains a sensitive ground current sample as well as the following voltage samples: phase A, phase B, and phase C. Thee second input channel (4) contains the following fine current samples: phase A, phase B, and phase C. Based upon a selector input received from the latch (10), the analog multiplexer, (6) gates through the desired fine or coarse channel input to the programmable gain amplifier ("PGA") (8).

The PGA (8) automatically scales the gain of the sample it receives based upon its selector input from the latch (10). After the latch (10) receives a selector input from the digital signal processor ("DSP") (14), the latch (10) outputs the selector input to the analog multiplexer (6) and the PGA (8). The gains in the PGA (8) are automatically set by the DSP (14) based upon changes in the value of the pickup current, so that the fine channel inputs will not saturate until ten times the value of the pickup current. In addition, the gains in the PGA (8) are also adjusted so that the coarse channel inputs will not saturate until approximately forty or fifty times the value of the pickup current. Consequently, a wide dynamic range is maintained.

An analog-to-digital converter (12) is coupled to and receives an analog input signal from the output of the PGA (8). The analog-to-digital converter (12) converts the analog input signal that is a function of a continuous variable into a representative number sequence. The representative number sequence is then sent to the DSP (14). The DSP (14) performs a number of functions on the inputted representative number sequence.

One of the primary functions of the DSP (14), is to perform all discrete fourier transforms and store the result of each calculation. The DSP (14) performs discrete fourier transforms on the representative number sequences in order to calculate the fundamental real current component ($I_{Real}$), the imaginary current component ($I_{Imag}$), and the DC current component ($I_{DC}$). The DSP (14) then calculates the current magnitude ($I_{Mag}$), based upon the fundamental real current component ($I_{Real}$), the fundament imaginary current component ($I_{Imag}$) and the DC current component ($I_{DC}$), pursuant to the following equation.

$$I_{Mag}=[(I_{DC})^2+(I_{Real})^2+(I_{Imag})^2]^{1/2}$$

In the foregoing equation, the current magnitude ($I_{mag}$) is equal to the square root of two multiplied by the root mean square of the current. Next, the DSP (14) compares the current magnitude to the possible current saturation value. If the current magnitude is less than the possible current saturation value, the current magnitude is multiplied by an appropriate scale, factor and used as the correct current magnitude. If the current magnitude exceeds the possible current saturation value, the current magnitude calculation is performed again using the coarse current samples obtained from the second input channel (4).

In addition to calculating the current magnitude, the DSP (14) also calculates the base two logarithm of the current magnitude. The DSP (14) then transmits the current magnitude and the base two logarithm of the current magnitude to the main processor (16). The DSP (14) samples at thirty-two times the fundamental power line frequency. This sampling rate enables the DSP (14) to filter out harmonics up to the thirtieth harmonic. This sampling rate also allows harmonics to be calculated up to the fifteenth harmonic. The DSP (14) stores the remaining miscellaneous metering values in the main processor (16). In the preferred embodiment, the DSP (14) utilized is a model 2101 manufactured by Analog Devices.

Figure 11:
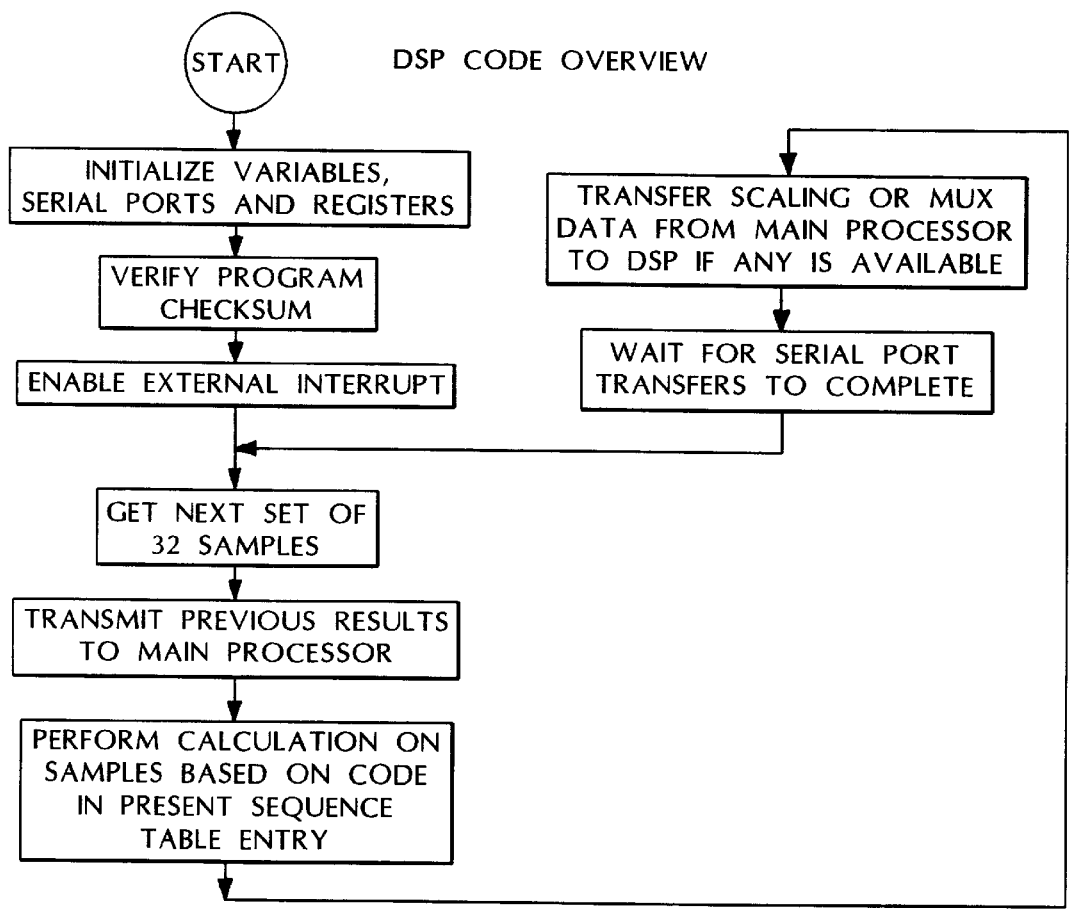
FIGS. 11–14 are flow charts of functions performed by a processor used in the electrical circuit.
Figure 12:
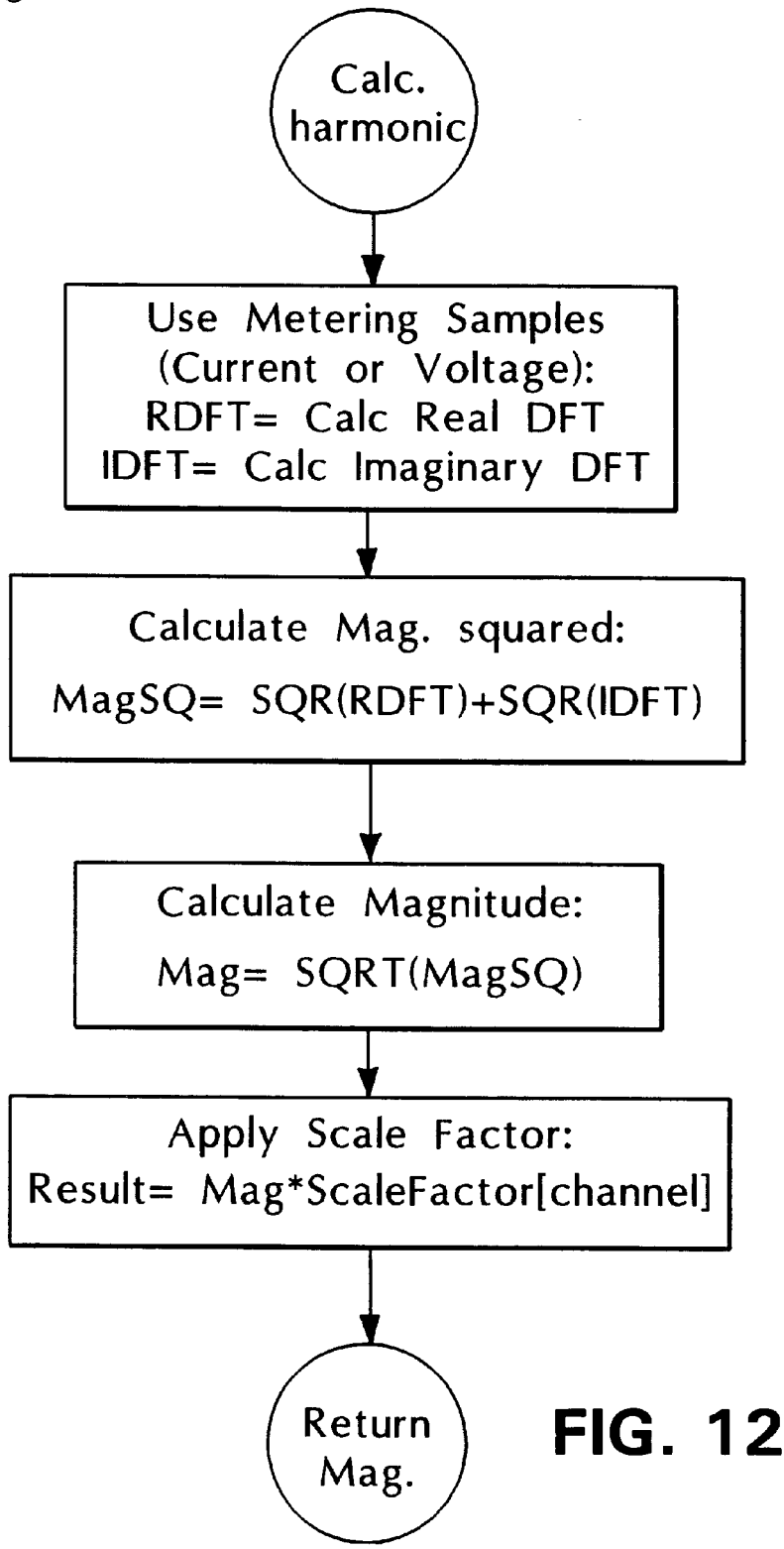
Figure 13:
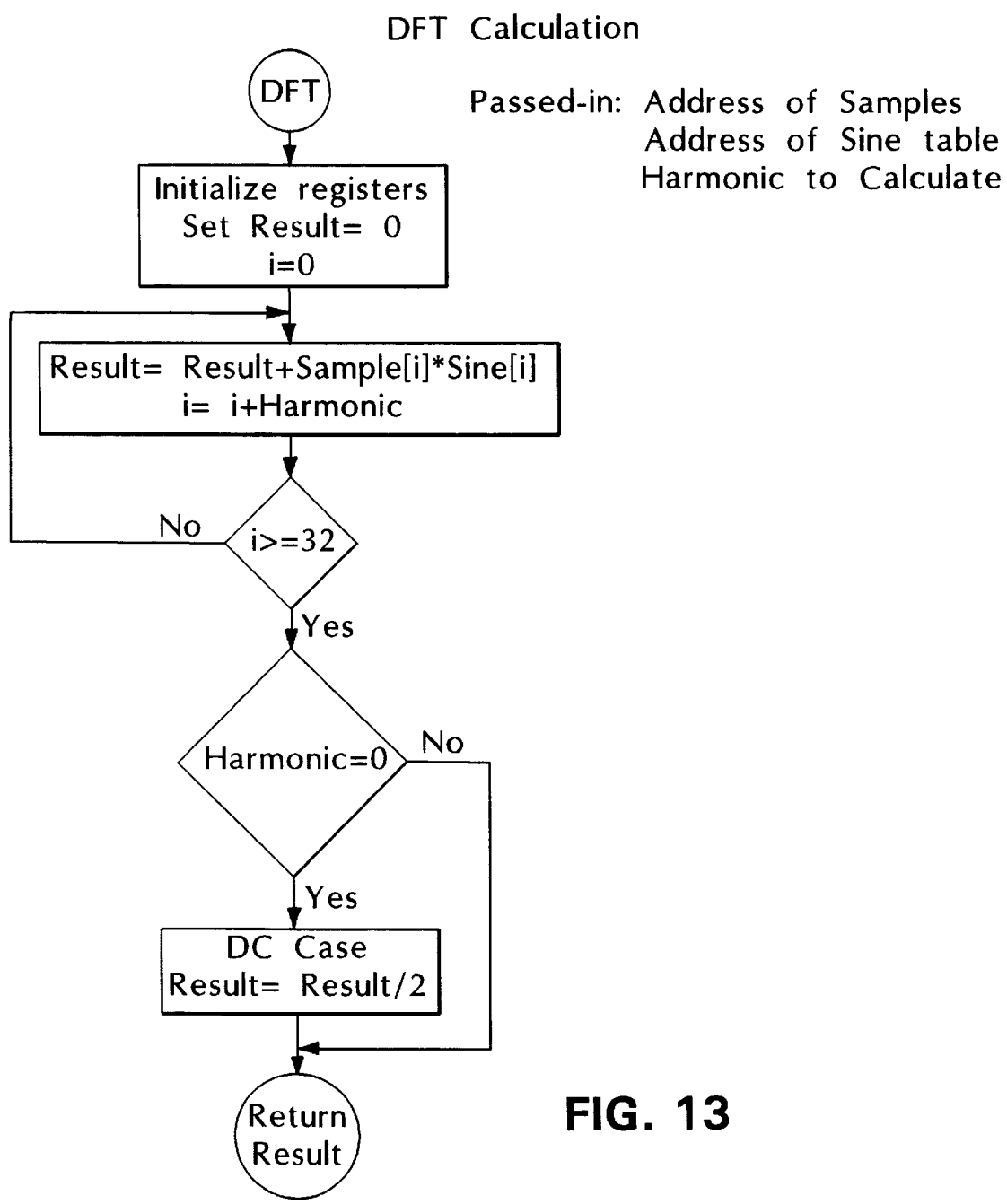
Figure 14:
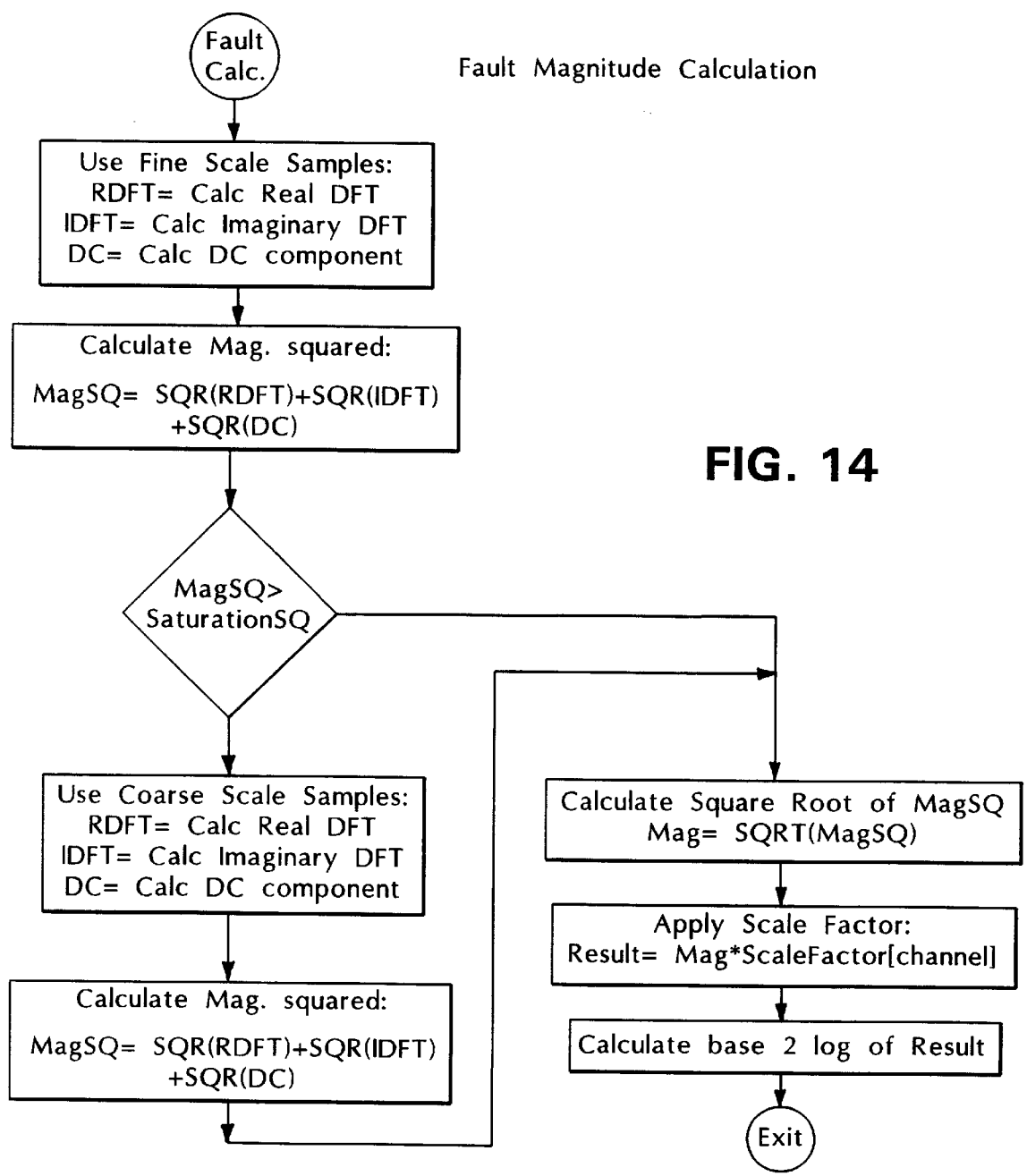

For a better understanding of the functions performed by the DSP (14), reference may be had to the flow charts in FIGS. 11–14. FIG. 11 shows an overview of the DSP code. FIG. 12 shows the calculation of the harmonic magnitude. FIG. 13 shows the discrete fourier transform (DFT) calculation. FIG. 14 shows the fault magnitude calculation.

The main processor (16) also performs a number of functions. The main processor (16) receives both the current magnitude and the base two logarithm of the current magnitude from the DSP (14). The DSP program resides in the read only memory ("ROM") of the main processor (16). Upon system initiation, the main processor (16) uploads the DSP program from its ROM to the DSP (14). In addition, the main processor (16) continually performs a low speed frequency measurement and adjusts the sampling rate of the DSP (14) accordingly. Lastly, the main processor (16) is responsible for all miscellaneous reclosure functions, communications capability functions, discrete input and output, data recording, event monitoring, historical trending, and metering functions. In the preferred embodiment, the main processor (16) utilized is a Motorola 68332 microprocessor.

In FIG. 2, a single line diagram of the preferred embodiment of the electrical circuit is shown. In the preferred embodiment, there are sixteen separate signal inputs which are separated into two groups (18 & 20). The first group of signal inputs (18) consists of the phase B voltage, phase C voltage, phase B fine current, phase A coarse current, phase C coarse current, and the fine ground current. The second group of signal inputs (20) consists of the phase A voltage, phase A fine current, phase C fine current, phase B coarse current, coarse ground current, and the sensitive ground fault current.

Each signal input passes through its own anti-aliasing filter circuit (22 & 24) before reaching its corresponding eight-bit analog multiplexer (26 & 28). Each eight-bit analog multiplexer (26 & 28) and each programmable gain amplifier (30 & 32) receives its selector input from its corresponding latch (34 & 36). As described supra, the DSP (14) transmits the appropriate selector input to the latches (34 & 36). The latches (34 & 36) then transmit the required selector inputs to the eight-bit analog multiplexers (26 & 28) and the PGA's (30 & 32). Subsequently, each of the PGA's (30 & 32) send an analog output signal to the analog-to-digital converter (12).

As described supra, the analog-to-digital converter (12) converts the analog signal received from the PGA (8) to a representative number sequence. The representative number sequence is then transmitted to the DSP (14). The remaining components of the electrical circuit is shown in FIG. 2 operate identically as described supra in accordance with FIG. 1.

Figure 3:
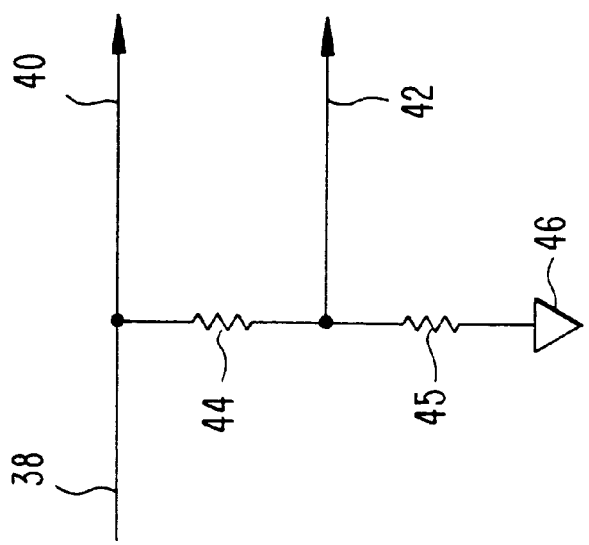
FIG. 3 shows the fine and coarse scales for the phase A current, the phase B current and the phase C current, FIG. 2.

FIG. 3 shows the typical electrical circuit utilized to generate the fine and coarse current samples for each phase current input. More specifically, the circuit is used to obtain the fine and coarse current samples from the phase A current input, phase B current input, and phase C current input. Each phase current input has its own separate circuit; however, each circuit is identical. In this configuration, the phase current input (38) enters the circuit. Based upon the principal of current division, the fine current sample (40) and the coarse current sample (42) are generated from each phase current input (38). In the preferred embodiment, the first resistor (44) has a resistance of 59Ω, a wattage of 1 W, and a tolerance of 1%. The second resistor (45) has a resistance of 8.45Ω, a wattage of ¼ W, and a tolerance of 1%. The resistors (44 & 45) are connected in parallel with the fine current sample (40). The common (46) is coupled to the second resistor (45) in the circuit.

Figure 4:
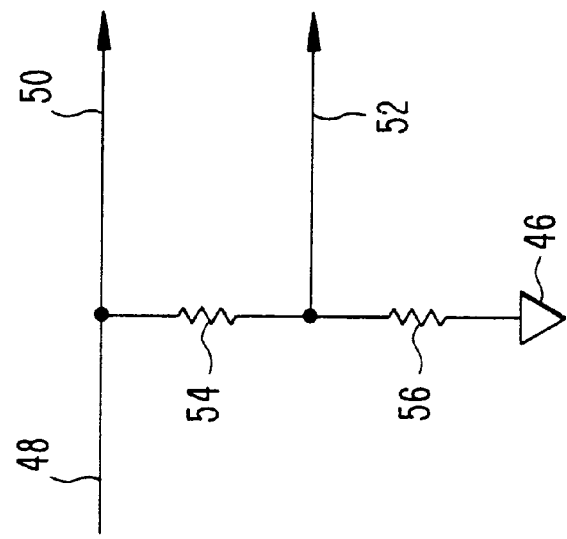
FIG. 4 shows the fine and coarse scales for the ground current in accordance with FIG. 2.

FIG. 4 shows the electrical circuit utilized to generate the fine and coarse current samples from the ground current input. The ground current input has its own separate circuit; however, it is very similar to the circuits for the phase current inputs. In this configuration, the ground current input (38) enters the circuit. Based upon the principal of current division, the fine current sample (50) and the coarse current sample (52) are generated from the ground current input (48). In the preferred embodiment, the first resistor in this circuit (54) has a resistance of 118Ω, a wattage of 1 W, and a tolerance of 1%. The second resistor in this circuit (56) has a resistance of 16.9Ω, a wattage of ¼ W, and a tolerance of 1%. The resistors (54 & 56) are connected in parallel with the fine current sample (52). The common (46) is coupled to the second resistor (45) in the circuit.

Figure 5:
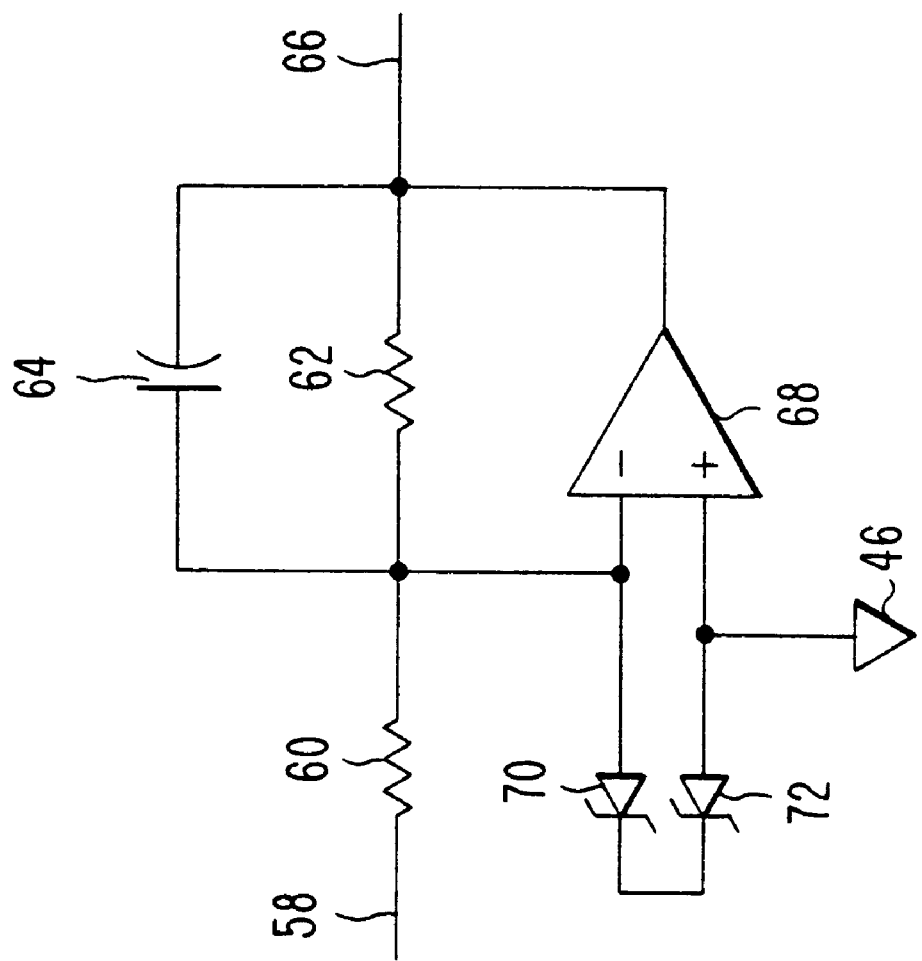
FIG. 5 shows a detailed wiring diagram for the typical anti-aliasing filters identified in FIG. 1 and FIG. 2.

FIG. 5 shows a detailed wiring diagram for the typical anti-aliasing filters identified in FIG. 1 and FIG. 2. Before entering the multiplexers (26 & 28), the inputs (18 & 24) must each pass through an anti-aliasing filter circuit (22 & 24) as shown in FIG. 5. Each separate signal input passes through its own anti-aliasing circuit. In FIG. 5, the signal input (58) enters the circuit. A first resistor (60) is coupled in series in to the signal input (58). The opposing end of the first resistor (60) is connected in series to the parallel combination of a second resistor (62) and a capacitor (64). Each resistor (60 & 62) has a resistance of 100,000Ω, has a tolerance of 0.5% and is 0.1% matched within the network. The capacitor (64) has a capacitance of 0.0015 μF, a voltage of 50 V, and a tolerance of 5%.

The negative input of the operational amplifier (68) is coupled to two zener diodes (70 & 72) in series with each other. However, the zener diodes (70 & 72) are diametrically opposed with respect to each other. The positive input of the operational amplifier (68) is connected in parallel with the common (46) and the zener diodes (70 & 72). The output of the anti-aliasing filter circuit (66) is connected in parallel with the capacitor (64), the second resistor (62), and the output of the operational amplifier (68).

In FIG. 6, a wiring diagram for the typical PGA identified in FIG. 1 and FIG. 2 is shown. The PGA input (74) is coupled to the output of its respective multiplexer (26 or 28). The PGA input (74) is directly connected to the first input of the PGA multiplexer (76). In addition, the PGA input (74) is operatively coupled to the following inputs: the operational amplifier circuit with the fixed gain of two (78), the operational amplifier with the fixed gain of four (80), the operational amplifier with the fixed gain of eight (82), and the operational amplifier with the fixed gain of sixteen (84).

The output of the operational amplifier circuit with the fixed gain of two (78) is coupled to the second input of the PGA multiplexer (76). The output of the operational amplifier circuit with the fixed gain of four (80) is operatively connected to the third input of the PGA multiplexer (76). The output of the operational amplifier circuit with the fixed gain of eight (82) is connected to the fourth input of the PGA multiplexer (76). Lastly, the output of the operational amplifier circuit with the fixed gain of sixteen (84) is operatively coupled to the fifth input of the PGA multiplexer (76). The selector input (88) of the PGA multiplexer is coupled to its respective latch (34 or 36). The output of the PGA multiplexer (86) is connected to the analog-to-digital converter (12).

Figure 7:
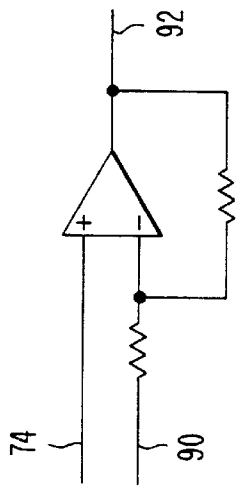
FIG. 7 shows a detailed wiring diagram for the operational amplifier circuit with the fixed gain of two in accordance with FIG. 6.

In FIG. 7, a detailed wiring diagram for the operational amplifier circuit with the fixed gain of two in accordance with FIG. 6 is shown. The PGA input (74) is connected to the positive input of the operational amplifier. The second input for this circuit (90) is connected to the common. The output for this circuit (92) is coupled to the second input of the PGA multiplexer (76). Each resistor in this circuit has a resistance of 1,000Ω, has a tolerance of 0.5% and is 0.1% matched within the network.

Figure 8:
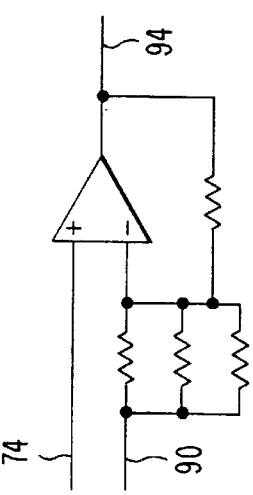
FIG. 8 shows a detailed wiring diagram for the operational amplifier circuit with the fixed gain of four in accordance with FIG. 6.

In FIG. 8, a detailed wiring diagram for the operational amplifier circuit with the fixed gain of four in accordance with FIG. 6 is shown. The PGA input (74) is connected to the positive input of the operational amplifier. The second input for this circuit (90) is connected to the common. The output for this circuit (94) is coupled to the third input of the PGA multiplexer (76). Each resistor in this circuit has a resistance of 1,000Ω, has a tolerance of 0.5% and is 0.1% matched within the network.

Figure 9:
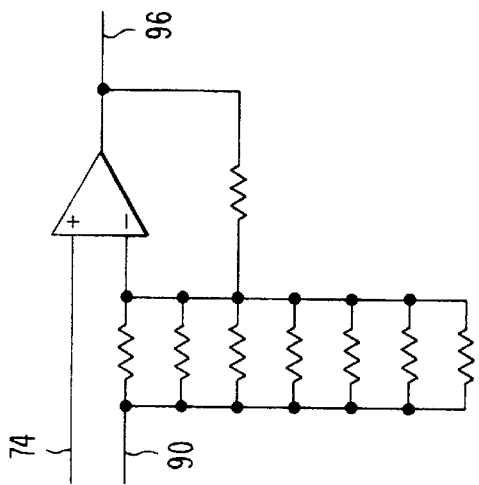
FIG. 9 shows a detailed wiring diagram for the operational amplifier circuit with the fixed gain of eight in accordance with FIG. 6.

In FIG. 9, a detailed wiring diagram for the operational amplifier circuit with the fixed gain of eight in accordance with FIG. 6 is shown. The PGA input (74) is connected to the positive input of the operational amplifier. The second input for this circuit (90) is connected to the common. The output for this circuit (96) is coupled to the fourth input of the PGA multiplexer (76). Each resistor in this circuit has a resistance of 1,000Ω, has a tolerance of 0.5% and is 0.1% matched within the network.

Figure 10:
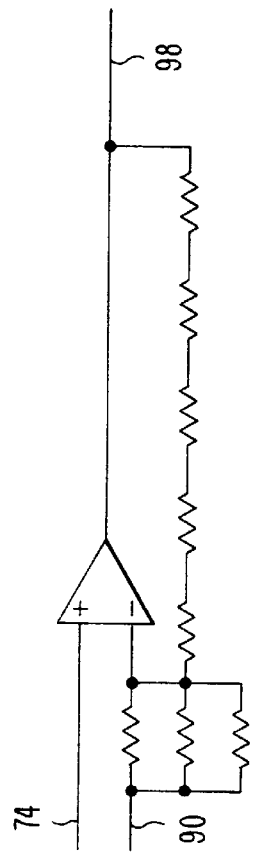
FIG. 10 shows a detailed wiring diagram for the operational amplifier circuit with the fixed gain of sixteen in accordance with FIG. 6.

In FIG. 10, a detailed wiring diagram for the operational amplifier circuit with the fixed gain of sixteen in accordance with FIG. 6 is shown. The PGA input (74) is connected to the positive input of the operational amplifier. The second input for this circuit (90) is connected to the common. The output for this circuit (98) is coupled to the fifth input of the PGA multiplexer (76). Each resistor in this circuit has a resistance of 1,000Ω, has a tolerance of 0.5% and is 0.1% matched within the network.

We claim:

1. An electrical circuit for improving fault current measurement accuracy for use with electronic reclosure controls, the electrical circuit comprising:

a first input channel connected to receive a first current sample, the first input channel exhibiting a first sensitivity level;

a second input channel connected to receive a second current sample, the second input channel exhibiting a second sensitivity level different from the first sensitivity level;

a first multiplexer connected to receive the first current sample, the second current sample, and a selector input, and operable to output one of the first or second current samples based on the selector input;

a programmable gain amplifier connected to receive a gain selector input and the output of the first multiplexer, and operable to automatically scale the first multiplexer output by a gain based on the gain selector input;

an analog-to-digital converter connected to receive the scaled first multiplexer output from the programmable gain amplifier, and operable to convert the scaled first multiplexer output into a digital signal;

a digital signal processor connected to receive the digital signal from the analog-to-digital converter, and operable to:

generate the selector input for the first multiplexer to obtain a first value of the digital signal corresponding to the first current sample, calculate a first current magnitude from the first digital signal value, compare the first current magnitude to a possible current saturation value, if the first current magnitude is less than the possible current saturation value, scale the first magnitude by a first scale factor to obtain a correct current magnitude, if the first current magnitude is greater than or equal to the possible current saturation value:

generate the selector input for the first multiplexer to obtain a second value of the digital signal corresponding to the second current sample, calculate a second current magnitude from the second digital signal value, and scale the second current magnitude by a second scale factor to obtain the correct current magnitude, and provide the correct current magnitude as a current measurement output.

2. An electrical apparatus for measuring fault current on a power line comprising:

a first input channel for obtaining a first current sample from the power line, wherein the first input channel exhibits a first sensitivity level;

a second input channel for obtaining a second current sample from the power line, wherein the second input channel exhibits a second sensitivity level that is different from the first sensitivity level; and a signal processor connected to the first and second input channels, and operable to:

calculate a first current magnitude based on the first current sample, compare the first current magnitude to a possible current saturation value, if the first current magnitude is less than the possible current saturation value, use the first current magnitude to generate the fault current measurement for the power line, and if the first current magnitude is greater than or equal to the possible current saturation value:

determine a second current magnitude based on the second current sample;

scale the second current magnitude by a scale factor; and use the second current magnitude to generate as the fault current measurement for the power line.

3. The apparatus of claim 2, wherein the first sensitivity level is more sensitive relative to the second sensitivity level.

4. The apparatus of claim 2, further comprising:

a voltage divider having a first node and a second node, wherein the first input channel is coupled to the first node and the second input channel is coupled to the second node.

5. An electrical circuit for measuring fault current on a power line comprising:

a multiplexer having a first input and a second input, wherein the first input receives a first current sample measured at a first sensitivity level and the second input receives a second current sample measured at a second sensitivity level;

a digital signal processor connected to an output of the multiplexer, and operable to calculate a first current magnitude as a function of the first current sample, compare the first current magnitude to a possible current saturation value, if the first current magnitude is greater than or equal to the possible current saturation value, calculate a second current magnitude as a function of the second current sample;

a programmable gain amplifier operatively interposed between the multiplexer and the digital signal processor, wherein the programmable gain amplifier scales the second current magnitude; and a latch operable to select the scaled second current magnitude as the measure of fault current if the first current magnitude is greater than or equal to the possible current saturation value.

6. The electrical circuit of claim 5, wherein the digital signal processor is operable to:

determine a real current component based on the first current sample;

determine an imaginary current component based on the first current sample; and determine a DC component based on the first current sample, wherein the digital signal processor calculates the first current magnitude as a function of the real, imaginary and DC components of the first current sample.

7. The electrical circuit of claim 5, wherein the digital signal processor is operable to:

determine a real current component based on the second current sample;

determine an imaginary current component based on the second current sample; and determine a DC component based on the second current sample, wherein the digital signal processor calculates the second current magnitude as a function of the real, imaginary and DC components of the second current sample.

8. The electrical circuit of claim 5, wherein the first sensitivity level is more sensitive relative to the second sensitivity level.

9. The electrical current of claim 5, further comprising a voltage divider, wherein the voltage divider has a first node connected to the first input of the multiplexer, and a second node connected to the second input of the multiplexer.

10. The electrical circuit of claim 1, wherein the programmable gain amplifier scales the first multiplexer output by a gain of one, two, four, eight, or sixteen.

11. An electrical apparatus for measuring fault current on a power line, the apparatus comprising:
- a first input channel for obtaining a first current sample from the power line, the first input channel exhibiting a first sensitivity level;
- a second input channel for obtaining a second current sample from the power line, the second input channel exhibiting a second sensitivity level that is different from the first sensitivity level; and
- a digital signal processor connected to receive the first and second current samples, and operable to:
  - calculate a first current magnitude based on the first current sample,
  - compare the first current magnitude to a possible current saturation value, and
  - if the comparison agrees with a predetermined criterion:
    - determine a second current magnitude based on the second current sample,
    - scale the second current magnitude by a scale factor, and
    - use the second current magnitude in generating the fault current measurement for the power line; and
  - if the comparison does not agree with the predetermined criterion, use the first current magnitude in generating the fault current measurement for the power line.

12. The electrical apparatus of claim 11, wherein the predetermined criterion includes the criterion that the first current magnitude is greater than the possible current saturation value.

13. The electrical apparatus of claim 11, wherein the predetermined criterion includes the criterion that the first current magnitude is less than the possible current saturation value.

* * * * *